US008322920B2

(12) United States Patent
Rapp et al.

(10) Patent No.: US 8,322,920 B2

(45) Date of Patent: Dec. 4, 2012

(54) METHOD AND DEVICE FOR ASCERTAINING A TEMPERATURE OF A SHEATHED-ELEMENT GLOW PLUG IN AN INTERNAL COMBUSTION ENGINE

(75) Inventors: Bernd Rapp, Hemmingen (DE); Sascha Joos, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 201 days.

(21) Appl. No.: 12/925,925

(22) Filed: Nov. 1, 2010

(65) Prior Publication Data

US 2011/0134960 A1 Jun. 9, 2011

(30) Foreign Application Priority Data

Nov. 19, 2009 (DE) ......................... 10 2009 046 658
Dec. 8, 2009 (DE) ......................... 10 2009 047 650

(51) Int. Cl.
*G01K 1/12* (2006.01)
*G01K 1/08* (2006.01)
*G01K 1/14* (2006.01)

(52) U.S. Cl. ........................................................ 374/144

(58) Field of Classification Search ................... 374/144
See application file for complete search history.

(56) References Cited

U.S. PATENT DOCUMENTS

2004/0188408 A1* 9/2004 Kumada et al. ............... 219/260
2010/0094524 A1* 4/2010 Ehlert ........................... 701/102
2011/0127250 A1* 6/2011 Rapp et al. .................... 219/260

FOREIGN PATENT DOCUMENTS

EP 1 719 909 11/2006

* cited by examiner

*Primary Examiner* — Lisa Caputo
*Assistant Examiner* — Jamel Williams
(74) *Attorney, Agent, or Firm* — Kenyon & Kenyon LLP

(57) ABSTRACT

In a method for ascertaining a temperature of a sheathed-element glow plug in an internal combustion engine, a temperature difference between the temperature of a glow plug heater inside the sheathed-element glow plug and a temperature at an arbitrary location on the sheathed-element glow plug is determined as a function of at least one operating parameter of the internal combustion engine and/or at least one operating parameter of the sheathed-element glow plug. The temperature of the sheathed-element glow plug is ascertained from a temperature value represented by a measured value, and from the determined temperature difference.

11 Claims, 1 Drawing Sheet

METHOD AND DEVICE FOR ASCERTAINING A TEMPERATURE OF A SHEATHED-ELEMENT GLOW PLUG IN AN INTERNAL COMBUSTION ENGINE

BACKGROUND OF THE INVENTION

1. Field of the Invention

The present invention relates to a method for ascertaining a temperature of a sheathed-element glow plug in an internal combustion engine, in which a temperature difference between the temperature of a glow plug heater inside the sheathed-element glow plug and the temperature at an arbitrary location on the sheathed-element glow plug is determined as a function of at least one operating parameter of the internal combustion engine and/or at least one operating parameter of the sheathed-element glow plug, and a device for carrying out the method.

2. Description of the Related Art

Sheathed-element glow plugs, which are used in internal combustion engines for igniting a fuel-air mixture, have a heater which preheats the cold sheathed-element glow plug to a temperature which is high enough for igniting the fuel-air mixture. However, the distribution of the temperature, starting from the heater and extending over the entire sheathed-element glow plug, is very inhomogeneous, resulting in temperature differences between the temperature of the heater inside the sheathed-element glow plug and the temperature at the surface of the sheathed-element glow plug.

Since the sheathed-element glow plug protrudes into the combustion chamber of the internal combustion engine, the surface of the sheathed-element glow plug is always cooled by the air stream which flows as a fuel-air mixture past the sheathed-element glow plug during dynamic operation of the internal combustion engine, so that the surface of the sheathed-element glow plug is never at the temperature of the heater inside the sheathed-element glow plug.

A method for operating a sheathed-element glow plug is known from published European patent document EP 1 719 909 B1, in which the sheathed-element glow plug is situated in the combustion chamber of the internal combustion engine. The cooling characteristics of the sheathed-element glow plug are computed as a function of the combustion temperature and the sheathed-element glow plug temperature. The temperature of the sheathed-element glow plug is computed from the electrical power consumed by the sheathed-element glow plug, while the combustion temperature in the combustion chamber is ascertained as a function of the air temperature, the cooling water temperature, the rotational speed of the internal combustion engine, and the load.

If the temperature of the sheathed-element glow plug is to be subject to control, this control is carried out as a function of the resistance of a current-conducting wire inside the sheathed-element glow plug, from which the actual controlled value of the temperature is ascertained. The resistance is higher the greater the temperature of the wire. Due to the temperature difference which occurs, the quality of the control of the sheathed-element glow plug temperature is inadequate, since this control is not based on a temperature which is actually present at the surface of the sheathed-element glow plug.

BRIEF SUMMARY OF THE INVENTION

An object of the present invention is to provide a method and a device for ascertaining a temperature of a sheathed-element glow plug in an internal combustion engine, which allows the temperature difference between the temperature of the sheathed-element glow plug at a location outside the heater and the temperature at the heater of the sheathed-element glow plug to be determined.

According to the present invention, the object is achieved in that the temperature difference is determined as a function of a time function, and the temperature of the sheathed-element glow plug is ascertained from a temperature value, which is represented by a measured value, and from the temperature difference, which is influenced by the time function. The advantage of the present invention is that the temperature difference is determined during dynamic operation of the internal combustion engine, i.e., under the variable operating conditions of the internal combustion engine. The fact that the fuel-air mixture, which flows past the sheathed-element glow plug at varying speeds and quantities depending on the operating state of the internal combustion engine, influences the temperature at the surface of the sheathed-element glow plug is taken into account. It is thus possible to precisely ascertain the temperature of the sheathed-element glow plug in nonstationary operation of the sheathed-element glow plug. Applications are possible without an additional thermocouple which measures the temperature at the arbitrary location on the sheathed-element glow plug.

The time function is advantageously determined from a time constant which is ascertained once for the sheathed-element glow plug and stored. Thus, only a few values are necessary for determining the temperature difference. The time constant indicates the thermal inertia of the sheathed-element glow plug in the respective cylinder of the internal combustion engine, which is the same for all computation steps.

In another implementation, the time constant is corrected as a function of a rotational speed of or load on the internal combustion engine in a dynamic driving mode or as a function of the voltage, i.e., the power, applied to the sheathed-element glow plug.

The time function also represents a measure of how strongly an instantaneously determined temperature difference is influenced by a preceding temperature difference.

In one embodiment, the influence on the instantaneously determined temperature difference by a preceding temperature difference is described by an exponential function or a power series. The exponential function characterizes in a particularly accurate manner how strongly the instantaneous temperature difference is influenced by the preceding temperature difference.

In one refinement, the operating parameters of the internal combustion engine and/or the characteristics of the sheathed-element glow plug are measured for determining a stationary temperature difference during stationary engine operation, and from this value the stationary temperature difference is computed. Taking into account the operating parameters of the internal combustion engine or the characteristics of the sheathed-element glow plug allows the temperature difference to be determined very accurately, since this temperature difference reflects the actual state of the internal combustion engine and of the sheathed-element glow plug, which are used in computing the temperature difference of the sheathed-element glow plug.

During stationary engine operation, the rotational speed of the internal combustion engine and the injection quantity in the internal combustion engine are advantageously measured, from which a first stationary temperature difference is computed. Since these operating parameters are also detected for evaluating other situations of the internal combustion engine, no additional hardware is necessary to obtain these measured data.

Alternatively, when air is static in the internal combustion engine the power consumed by the sheathed-element glow plug which is necessary for reaching a certain predefined temperature is measured, and from this value a second stationary temperature difference is computed. The advantage of this procedure is that the control unit of the motor vehicle, which is responsible for monitoring the glow temperature of the sheathed-element glow plug, is able to independently determine this second temperature difference without further auxiliary means. The specified glow parameters of the sheathed-element glow plug are thus always maintained.

In another variant, the air mass in the internal combustion engine and/or the charge pressure of the air mass and the temperature of the air mass are measured, and from these values a third temperature difference is computed. In this case as well, the operating parameters necessary for computing the third temperature difference are already ascertained for other purposes in the internal combustion engine, so that additional provision of sensors or measuring equipment may be dispensed with.

In one refinement, the temperature difference, which is a function of the time function, is supplied to a system for controlling the temperature of the sheathed-element glow plug, in which the temperature value of the sheathed-element glow plug, which is represented by a measured value, is ascertained as a function of the resistance of a current-conducting wire of the sheathed-element glow plug, the temperature difference being added to the temperature value of the sheathed-element glow plug which is represented by the measured value, resulting in an actual controlled value. By using the time function for determining the temperature difference, the control system takes into account the fact that the thermal flow from the glow wire inside the sheathed-element glow plug to the exterior of the sheathed-element glow plug requires a certain amount of time. This time offset is then taken into account in the control, resulting in increased control quality.

Another refinement concerns a device for ascertaining a temperature of a sheathed-element glow plug in an internal combustion engine, in which a temperature difference between the temperature of a sheathed-element glow plug heater inside the sheathed-element glow plug and a temperature at an arbitrary location on the sheathed-element glow plug is determined as a function of at least one operating parameter of the internal combustion engine. To allow the temperature difference between the temperature of the sheathed-element glow plug at a location outside the heater and the temperature at the heater of the sheathed-element glow plug to be determined, means are present which determine the temperature difference as a function of a time function, and ascertain the temperature of the sheathed-element glow plug from a temperature value, which represents a measured value, and from the temperature difference. This has the advantage that the temperature difference is determined during dynamic operation of the internal combustion engine, i.e., under the variable operating conditions of the internal combustion engine, and changing characteristics of the sheathed-element glow plug. This takes into account in particular the fact that the surface of the sheathed-element glow plug is continuously cooled as a result of the fuel-air mixture flowing past the sheathed-element glow plug in the combustion chamber.

In one embodiment, the sheathed-element glow plug protruding into the combustion chamber of an internal combustion engine is connected to a control unit which determines the temperature difference, which depends on the time function, as a function of the operating parameters of the internal combustion engine. In this regard, various control units may be used. For controlling the temperature of the sheathed-element glow plug, a glow time control unit is provided which cooperates with the engine control unit of the internal combustion engine, the engine control unit providing the glow time control unit with the measured operating parameters for determining the temperature difference. In the glow time control unit, the determined temperature difference is then taken into account in controlling the sheathed-element glow plug temperature, in which this temperature difference is added to a temperature which is ascertained as a function of the temperature-dependent resistance of the current-conducting glow wire of the sheathed-element glow plug. The temperature difference between the heater and a point at the surface of the sheathed-element glow plug which is thus determined may be evaluated for temperature control or temperature regulation of the sheathed-element glow plug.

DETAILED DESCRIPTION OF THE INVENTION

Cold internal combustion engines, in particular diesel engines, at ambient temperatures of <40° C. require starting assistance for igniting the fuel-air mixture which is introduced into the diesel engine. Glow systems composed of sheathed-element glow plugs, a glow time control unit, and glow software stored in an engine control unit are used as starting assistance.

Figure 1:
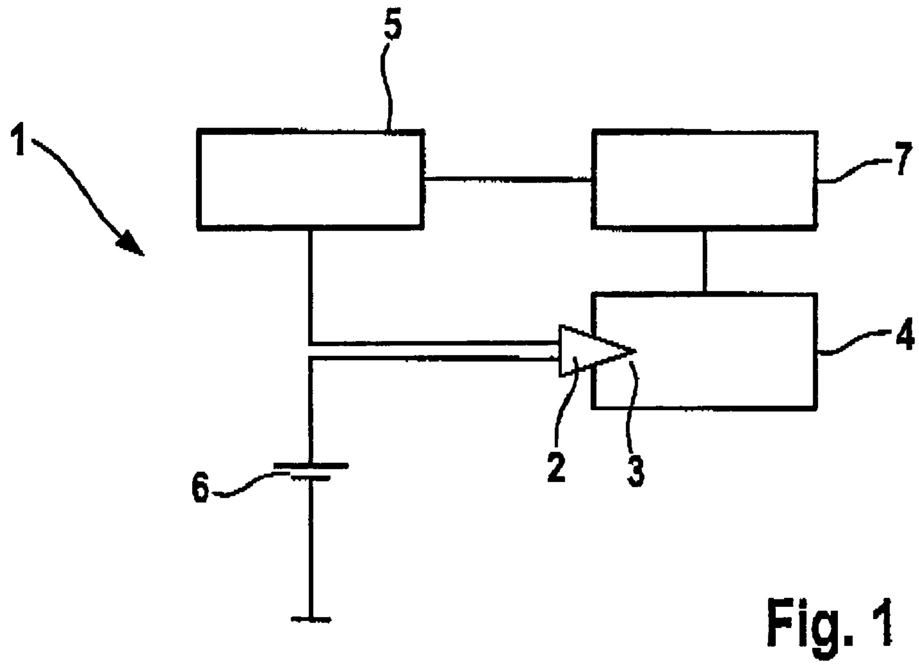
FIG. 1 shows a block diagram of the configuration of a sheathed-element glow plug in an internal combustion engine.

FIG. 1 shows such a glow system 1. A sheathed-element glow plug 2 protrudes into combustion chamber 3 of diesel engine 4. Sheathed-element glow plug 2 is on the one hand connected to glow time control unit 5, and on the other hand leads to a vehicle power supply voltage 6 which activates sheathed-element glow plug 2 with a nominal voltage of 11 V, for example. Glow time control unit 5 is connected to engine control unit 7, which in turn leads to diesel engine 4.

For igniting the fuel-air mixture, sheathed-element glow plug 2 is preheated in a "push phase," which lasts 1 to 2 seconds, by applying an overvoltage. The electrical power thus supplied to sheathed-element glow plug 2 is converted into heat in a heater coil (not illustrated in greater detail), which causes the temperature to abruptly increase at the tip of sheathed-element glow plug 2. The heating power of the heater coil is adapted to the requirements of the particular diesel engine 4, using electronic glow time control unit 5. The fuel-air mixture is led past the hot tip of sheathed-element glow plug 2 and is thus heated. In association with the heating of intake air, the ignition temperature of the fuel-air mixture is reached during the compression stroke of diesel engine 4.

Figure 2:
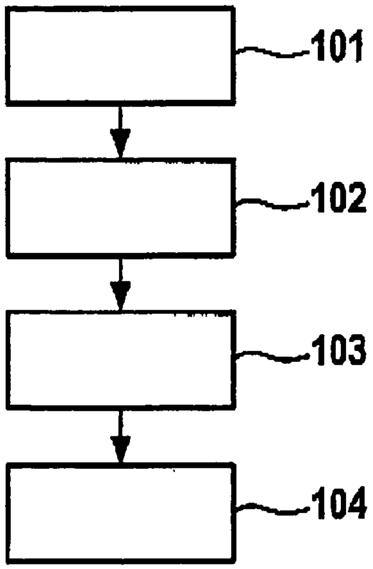
FIG. 2 shows a schematic flow chart for computing the temperature difference between the temperature of the heater and the temperature at an arbitrary point on the sheathed-element glow plug.

The determination of temperature difference $\Delta T$ of sheathed-element glow plug 2, which results from a difference of the heater temperature and the temperature at a location at the surface of sheathed-element glow plug 2, is explained with reference to FIG. 2. Operating parameters of diesel engine 4 are measured in block 101 in FIG. 2. These operating parameters include rotational speed n of diesel engine 4, injection quantity q, air mass $m_{air}$ of the air stream flowing into combustion chamber 3, charge pressure p, and temperature $T_{air}$ of the inflowing air.

Static models for simulating temperature difference ΔT are then provided in block 102. In the present case, "static" means that these temperature differences would result when diesel engine 4 operates in stationary mode. A distinction is made among three models:

In the first static model, temperature difference ΔT is determined as a function of injection quantity q of the fuel and rotational speed n of diesel engine 4. For this purpose, a characteristic map is measured once for injection quantity q, rotational speed n, and changing temperature difference ΔT, with the aid of a measuring plug. Temperature difference ΔT is determined from this characteristic map stored in engine control unit 7, based on the parameters rotational speed n and injection quantity q measured in block 101.

The second static model for determining temperature difference ΔT is determined as a function of power P consumed by sheathed-element glow plug 2 for reaching a desired temperature $T_{des}$. The following expression is valid:

$$\Delta T = a(T_{des}) * \exp(-b(T_{des}) * (T_{des}/P)) \quad (1)$$

Ratio TP of temperature to power $$TP = T_{des}/P \quad (2)$$

is a measure of the efficiency of sheathed-element glow plug 2 or a measure of the cooling of sheathed-element glow plug 2. The greater the power P supplied to sheathed-element glow plug 2 to reach a desired temperature $T_{des}$, the more intensely is sheathed-element glow plug 2 cooled.

A third model for determining temperature difference ΔT is based on the dependency of the temperature difference of air mass $m_{air}$ and temperature $T_{air}$ of the air, or on charge pressure p of the air and its temperature $T_{air}$. It is assumed that charge pressure p increases the greater the quantity of air that is supplied to the combustion chamber. Temperature difference ΔT is computed as follows:

$$\Delta T = a * m_{air} + b + (c * T_{air} + d) \quad (3)$$

or $$\Delta T = a \cdot p + b + (c \cdot T_{air} + d). \quad (4)$$

Coefficients a, b, c, d are based on measurements, and are determined once.

After the static models have been determined, a nonstationary model for temperature difference ΔT is provided in block 103 as follows:

$$\Delta T_{nonstat} = \Delta T_{old} * \exp(-dt/\tau) + \Delta T \cdot (1 - \exp((-dt/\tau)) \quad (5)$$

where

ΔT=temperature difference of a static model determined in block 102

$\Delta T_{old}$=nonstationary temperature difference which was determined in the preceding measuring cycle, dt=time interval of the measuring cycle, τ=time constant which indicates the thermal inertia of sheathed-element glow plug 2 in the cylinder of diesel engine 4 in which the sheathed-element glow plug is situated.

The exponential function in equation (5) indicates how strongly temperature difference $\Delta T_{nonstat}$ to be instantaneously determined is influenced by the nonstationary value of temperature difference $\Delta T_{old}$ determined in the preceding measuring cycle.

In block 104, nonstationary temperature difference $\Delta T_{nonstat}$ is then used in the control of the temperature of sheathed-element glow plug 2 carried out by glow time control unit 3. Instantaneous temperature T of the sheathed-element glow plug is ascertained in that first, with the aid of current and voltage measurement at the glow wire of sheathed-element glow plug 2, resistance R is ascertained, from which temperature T(R) is deduced. Alternatively, the temperature may be ascertained by measuring the electrical power, or measuring the power and the resistance. Temperature difference $\Delta T_{nonstat}$ determined in block 103 is added to this temperature T(R), resulting in actual temperature T.

$$T = T(R) + \Delta T_{nonstat} \quad (6)$$

In equation (6) it is taken into account that the thermal flow from the glow wire inside the sheathed-element glow plug to the surface of the sheathed-element glow plug requires a certain amount of time, which must be taken into account in the control as a time offset. Temperature T thus ascertained is compared to the setpoint value of the temperature. The current supply to the sheathed-element glow plug is adjusted as a function of the resulting difference in order to control the sheathed-element glow plug to the desired temperature.

What is claimed is:

1. A method for ascertaining a temperature of a sheathed-element glow plug in an internal combustion engine, comprising:

determining a temperature difference between a temperature of a glow plug heater inside the sheathed-element glow plug and a temperature at an arbitrary location on the sheathed-element glow plug as a function of at least one of an operating parameter of the internal combustion engine and an operating parameter of the sheathed-element glow plug, wherein the temperature difference is determined as a function of a time function; and ascertaining the temperature of the sheathed-element glow plug from a temperature value represented by a measured value and from the temperature difference determined as a function of the time function.

2. The method as recited in claim 1, wherein the time function is determined from a time constant ascertained for the sheathed-element glow plug and stored.

3. The method as recited in claim 2, wherein the time function represents a measure of how strongly an instantaneously determined temperature difference is influenced by a preceding temperature difference.

4. The method as recited in claim 3, wherein the influence on the instantaneously determined temperature difference by the preceding temperature difference is represented by one of an exponential function or a power series.

5. The method as recited in claim 1, wherein the at least one of an operating parameters of the internal combustion engine and an operating parameter of the sheathed-element glow plug is measured during stationary conditions of the internal combustion engine for determining a stationary temperature difference value, and wherein the stationary temperature difference value is used for determining the temperature difference determined as a function of the time function.

6. The method as recited in claim 5, wherein a rotational speed of the internal combustion engine and an injection quantity are measured for determining the stationary temperature difference value.

7. The method as recited in claim 5, wherein a power quantity consumed by the sheathed-element glow plug and necessary for reaching a predefined temperature is measured for determining the stationary temperature difference value.

8. The method as recited in claim 5, wherein at least one of an air mass, a charge pressure of the air mass, and a temperature of the air mass is measured for determining the stationary temperature difference value.

9. The method as recited in claim 5, wherein the temperature difference determined as a function of the time function is supplied to a control system for controlling the temperature of the sheathed-element glow plug, and wherein the control system determines a raw temperature value of the sheathed-element glow plug as a function of a resistance of a current-conducting wire of the sheathed-element glow plug, and wherein the control system generates an adapted temperature value of the sheathed-element glow plug by adding the temperature difference determined as a function of the time function to the raw temperature value of the sheathed-element glow plug.

10. A device for ascertaining a temperature of a sheathed-element glow plug in an internal combustion engine, comprising:

a control system configured to perform the following:

determining a temperature difference between a temperature of a glow plug heater inside the sheathed-element glow plug and a temperature at an arbitrary location on the sheathed-element glow plug as a function of at least one of an operating parameter of the internal combustion engine and an operating parameter of the sheathed-element glow plug, wherein the temperature difference is determined as a function of a time function; and ascertaining the temperature of the sheathed-element glow plug from a temperature value represented by a measured value and from the temperature difference determined as a function of the time function.

11. The device as recited in claim 10, wherein the sheathed-element glow plug protrudes into a combustion chamber of the internal combustion engine and is connected to the control system.

* * * * *